United States Patent [19]
Martin

[11] Patent Number: 5,860,139
[45] Date of Patent: Jan. 12, 1999

[54] BIOS MEMORY ADDRESS DECODER FOR PROVIDING AN EXTENDED BIOS MEMORY ADDRESS SPACE BY RECLAIMING A PORTION OF NON-BIOS ADDRESS SPACE

[75] Inventor: Brian Martin, Worcester, Mass.

[73] Assignee: Data General Corporation, Westboro, Mass.

[21] Appl. No.: 661,503

[22] Filed: Jun. 11, 1996

[51] Int. Cl.$^6$ ..................................................... G06F 12/02
[52] U.S. Cl. ................................................. 711/202; 711/2
[58] Field of Search ................................ 395/402; 711/2, 711/1, 5, 202

[56] References Cited

U.S. PATENT DOCUMENTS

| | | | |
|---|---|---|---|
| 4,831,522 | 5/1989 | Henderson et al. | 364/200 |
| 5,136,713 | 8/1992 | Bealkowski et al. | 395/700 |
| 5,187,792 | 2/1993 | Dayan et al. | 395/652 |
| 5,329,631 | 7/1994 | Ishibashi et al. | 395/425 |
| 5,371,876 | 12/1994 | Ewertz et al. | 395/425 |
| 5,479,639 | 12/1995 | Ewertz et al. | 711/103 |
| 5,481,754 | 1/1996 | Piazza | 395/823 |
| 5,577,221 | 11/1996 | Liu et al. | 395/427 |
| 5,606,680 | 2/1997 | Parvereshi et al. | 395/410 |
| 5,689,726 | 11/1997 | Lin | 395/830 |

*Primary Examiner*—Tod R. Swann
*Assistant Examiner*—Kevin Verbrugge
*Attorney, Agent, or Firm*—Gary D. Clapp, Esq.

[57] ABSTRACT

A BIOS address decoder for addressing an extended BIOS memory for storing additional microprograms in a computer system. A system component is connected from the bus for receiving program instruction addresses in a first address range and providing corresponding BIOS memory addresses in a corresponding first BIOS address range. The BIOS address decoder includes the system component to receive a first subset of bus address bits representing bus addresses in the first instruction address range and responsive to the first subset of bus address bits to generate corresponding BIOS addresses in the first BIOS address range and a BIOS address indication indicating that the first subset of bus address bits indicates a bus address in the first instruction address range. An extended BIOS decoder is connected from the bus to receive a second subset of bus address bits representing bus addresses including an extended instruction address range and from the system component to receive the BIOS address indication output and is responsive to the second subset of bus address bit and the BIOS address indication for generating an extended BIOS memory enable output having a first state when the second subset of bus address bits does not represent a bus address including the extended instruction address range and a second state when the second subset of bus address bits represent a bus address including the extended instruction address range.

2 Claims, 3 Drawing Sheets

| BIOS SECTION | SIZE | ADDRESS<1MB | ADDRESS<16MB | ADDRESS<4GB |
|---|---|---|---|---|
| High BIOS | 64K | 0F0000–0FFFFF | FF0000–FFFFFF | FFFF0000–FFFFFFFF<br>FFEF0000–FFEFFFFF |
| Low BIOS 4 | 16K | 0EC000–0EFFFF | FEC000–FEFFFF | FFFEC000–FFFEFFFF<br>FFEEC000–FFEEFFFF |
| Low BIOS 3 | 16K | 0E8000–0EBFFF | FE8000–FEBFFF | FFFE8000–FFFEBFFF<br>FFEE8000–FFEEBFFF |
| Low BIOS 2 | 16K | 0E4000–0E7FFF | FE4000–FE7FFF | FFFE4000–FFFE7FFF<br>FFEE4000–FFEE7FFF |
| Low BIOS 1 | 16K | 0E0000–0E3FFF | FE0000–FE3FFF | FFFE0000–FFFE3FFF<br>FFEE0000–FFEE3FFF |
| Enlarged BIOS | 384K | N/A | N/A | FFF80000–FFFDFFFF |

FIG. 3

BIOS MEMORY ADDRESS DECODER FOR PROVIDING AN EXTENDED BIOS MEMORY ADDRESS SPACE BY RECLAIMING A PORTION OF NON-BIOS ADDRESS SPACE

CROSS REFERENCES TO RELATED APPLICATIONS

The present Application is related allowed to U.S. patent application Ser. No. 08/661,504 filed Jun. 11, 1996 by Daniel Dennis Najemy for SOFT POWER SWITCHING FOR HOT INSTALLATION AND REMOVAL OF CIRCUIT BOARDS IN A COMPUTER SYSTEM, abandoned U.S. patent application Ser. No. 08/661,571 filed Jun. 11, 1996 by Michael Tehranian et al. for a DEVICE ACCESS CONTROLLER FOR VIRTUAL VIDEO/KEYBOARD/MOUSE INPUT/OUTPUT FOR REMOTE SYSTEM MANAGEMENT AND MAINTENANCE and allowed U.S. patent application Ser. No. 08/661,579 filed Jun. 11, 1996 by Robert Beauchamp et al. for a DEVICE ACCESS CONTROLLER AND REMOTE SUPPORT FACILITY FOR INSTALLATION OF CABLING IN A MULTIPROCESSOR SYSTEM, all of which are assigned to the assignee of the present Application.

FIELD OF THE INVENTION

The present invention relates to an improved system address space controller for a microprocessor based computer system and, in particular, to a system address space decoder for increasing, or extending, the memory space available for storing the Basic Input/Output System (BIOS) programs of a microprocessor based system.

BACKGROUND OF THE INVENTION

Most computer systems, and in particular, computer systems implemented using microprocessors as the central processing unit, such as the Intel 86xxx and Pentium™ families of microprocessors or the Motorola 68xxx family of microprocessors, are provided with a plurality of layers of programs for directing operations of the systems. The program layers commonly include a user layer, an operating system layer and a BIOS layer. The user layer is comprised of programs for executing applications programs directly under the control of a system user and for directing the system to perform specific user tasks, such as word processing or spreadsheet operations. The operating system layer contains programs that are responsive to the applications programs and user commands and that direct higher level operations of the system that are not specific to a particular application, such as UNIX™, DOS™ and Windows™. Finally, the BIOS level contains programs responsive to the operating system level programs for controlling the detailed operations of the system hardware.

The most common of such microprocessor based systems are those that have evolved from the original IBM personal computer family of systems, that is, systems using the Intel 86xxx and Pentium™ family of microprocessors and either the Microsoft DOS™ or Windows™ operating systems or the UNIX™ operating system. Originally developed as relatively simple systems for use by a single user to perform single, relatively simple tasks, the development of increasingly more powerful microprocessors and larger and less costly memory has resulted in microprocessor based systems evolving into systems that approach or equal the speed and power of many mainframe and supermini computers. The increasing power and memory of such systems has interacted with the design of programs running on the systems, however, so that the user programs and operating systems have become increasingly larger and more complex, as have the functions performed by the systems, thereby demanding even more powerful processors and more addressable system space, particularly for memory for storing and executing programs.

Although the increases in microprocessor power and speed and the increases in affordable memory have kept pace with the increasing demands imposed by user and system programs, there have been recurring problems in the continuing development of such systems. Many of these problems arise from architectural features that originated in the first systems of this type as reasonable design features and that were carried forward through successive generations of development, to maintain compatibility between successive generations of systems, to now present severe limitations on the further development of the systems.

One of the most significant and persistent of these problems is in memory allocation and management in the microprocessor systems based on the Intel 86xxx and Pentium™ family of microprocessors and, more specifically, in the allocation of system address space in these systems. In particular, in the original generations of these systems a maximum system address space on the order of 512–640 kilobytes was allocated as meeting reasonably foreseeable system needs and that space was allocated accordingly, with certain address ranges assigned to processor registers, input/output devices, and so on. The remainder of the system address space was allocated to memory for storing and executing programs as it was foreseen that user and operating system programs would require variable amounts of memory space. The BIOS programs and the memory for storing BIOS programs, however, were assigned a fixed range of address space that appeared, at the time, to be adequate for future requirements.

In later generations of these systems, however, and with increasingly more powerful microprocessors and increasingly larger user programs and correspondingly larger operating system programs taking advantage of the increased power and speed of the microprocessors, there was an increasing demand for an ever larger address space for program memory. This has been met, however, in the case of user and operating system programs by various methods that have taken advantage of the fact that the address space originally assigned to user and operating system programs was variable to provide extended or expanded address spaces for the user and operating system programs.

Recent developments in microprocessor based systems, however, have led to a requirement for additional address space for BIOS programs as the microprocessors and system components controlled by the BIOS programs and the functions to be performed by the BIOS programs have grown more complex and numerous. The address space allocated to BIOS programs, however, was originally fixed as to location and range, rather than variable as in the case of user and operating system programs, and thus does not readily lend itself to the extension and expansion methods used for user and operating system programs. In addition, the need to expand the BIOS address space has appeared long after the need to expand user program and operating system memory space, so that much of the address space that might have been assigned to extend the BIOS address space has already been used for other purposes.

The present invention provides a solution to these and other problems of the prior art.

SUMMARY OF THE INVENTION

The present invention is directed to a BIOS address decoder for addressing an extended BIOS memory for storing additional microprograms in a computer system.

The computer system includes a processor for performing operations on data, a memory for storing programs including sequences of program instructions for controlling the operations of the processor, a bus interconnecting the processor and memory for the transfer of program instructions, data and addresses therebetween, and a BIOS memory for storing microprograms for controlling operations of the processor, wherein the microprograms correspond to program instructions and include sequences of microinstructions for directing corresponding operations of the processor. The system also includes a system component connected from the bus for receiving program instructions as bus addresses in a first instruction address range and providing corresponding BIOS memory addresses in a corresponding first BIOS address range to the BIOS memory for reading corresponding microprograms from the BIOS memory to control the operations of the microprocessor.

According to the present invention, the BIOS address decoder includes the system component connected from the bus to receive a first subset of bus address bits representing bus addresses in the first instruction address range and responsive to the first subset of bus address bits to generate corresponding BIOS addresses in the first BIOS address range and a BIOS address indication indicating that the first subset of bus address bits indicates a bus address in the first instruction address range. An extended BIOS decoder is connected from the bus to receive a second subset of bus address bits representing bus addresses including an extended instruction address range and from the system component to receive the BIOS address indication output and is responsive to the second subset of bus address bit and the BIOS address indication for generating an extended BIOS memory enable output having a first state when the second subset of bus address bits does not represent a bus address including the extended instruction address range and a second state when the second subset of bus address bits represent a bus address including the extended instruction address range. The BIOS addresses generated by the system component and the extended BIOS memory enable output generated by the extended BIOS decoder then represent BIOS addresses in an extended BIOS address range.

In a further aspect of the present invention, the extended BIOS address decoder further includes the BIOS memory and an extended BIOS memory wherein the BIOS memory is connected from the system component to receive the BIOS addresses in the first BIOS address range and from the extended BIOS decoder to receive the extended BIOS memory enable output and responsive to the BIOS addresses and to the extended BIOS memory enable output in the first state to provide microprograms from a first set of microprograms. The extended BIOS memory is connected from the system component to receive the BIOS addresses in the first BIOS address range and from the extended BIOS decoder to receive the extended BIOS memory enable output and responsive to the BIOS addresses and to the extended BIOS memory enable output in the second state to provide microprograms from an extended set of microprograms.

DESCRIPTION OF THE DRAWINGS

The foregoing and other objects, features and advantages of the present invention will be apparent from the following description of the invention and embodiments thereof, as illustrated in the accompanying figures, wherein.

DESCRIPTION OF THE INVENTION

Figure 1:
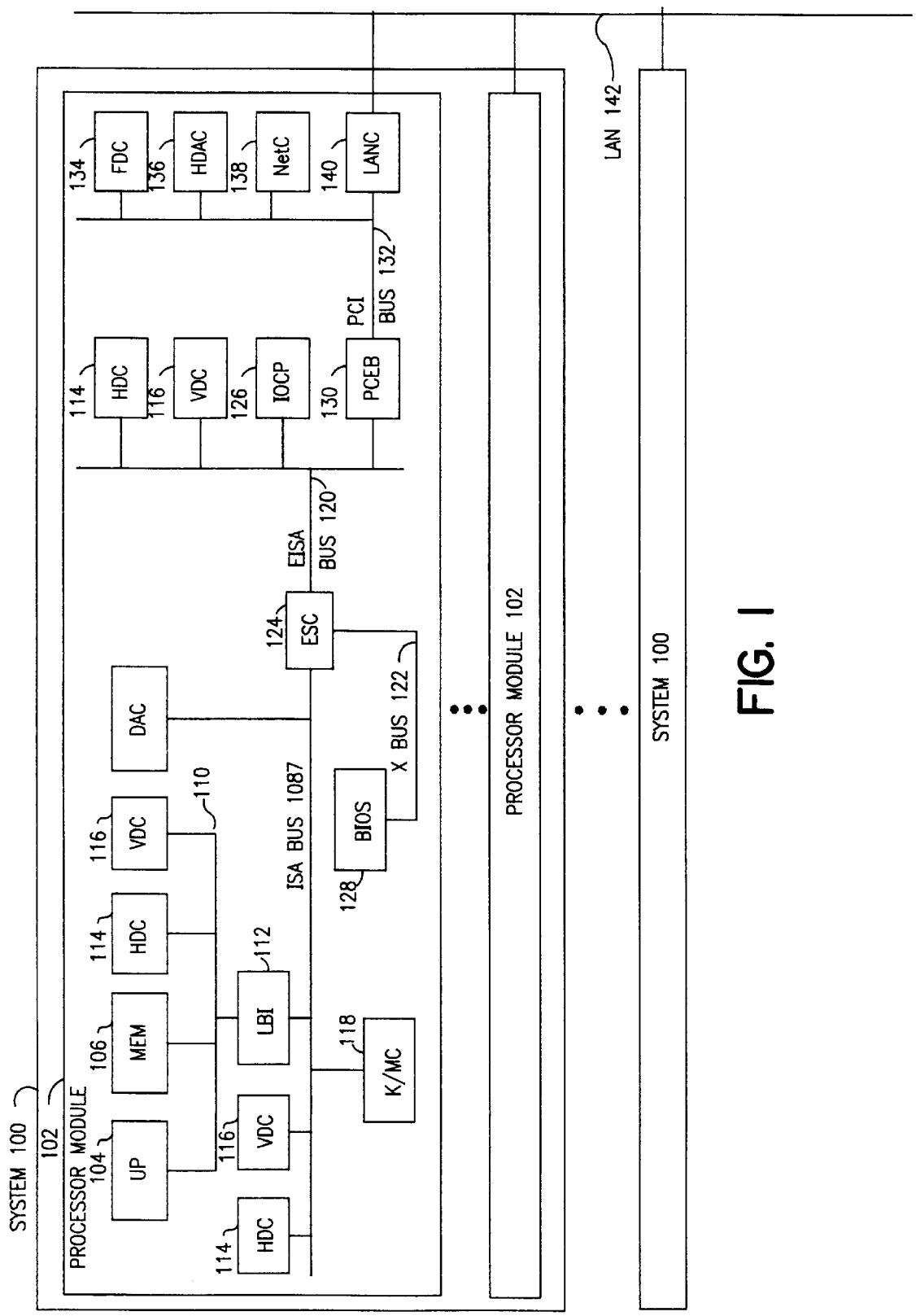
FIG. 1 is a diagrammatic representation of a system using a BIOS memory.

A. General Description and Discussion of a Microprocessor Based System (FIG. 1)

The following will first provide a general description of the structure and operation of a system incorporating the present invention, and a BIOS memory address decoder of the present invention, and will the provide more detailed descriptions of each of the functions and operations performed by a BIOS memory address decoder of the present invention, including the components performing each function or operation. It will be noted that the following descriptions follow the convention wherein elements referred to the text are identified in the text and in the drawings by three or four digit reference numbers. The leftmost digit or two digits identify the number of the drawing that an element first appears in while the two rightmost digits are assigned in the sequence in which the elements are discussed. For example, all elements referred to by reference numbers 100 through 199 first appear in FIG. 1, all elements identified by reference numbers 200 through 299 first appear in FIG. 2, and so on, while element 100 is the first element discussed with regard to FIG. 1, 102 the second, and so on. It will be apparent, therefore, that certain reference numbers out of each sequence for a given Figure are not used.

Referring to FIG. 1, therein is shown a general block diagram of an exemplary System 100 incorporating the present invention. As illustrated therein, System 100 may include one or more Processor Modules (PM) 102, an exemplary one of which is illustrated in block diagram form in FIG. 1.

As illustrated in the example of FIG. 1, a Processor Module (PM) 102 is comprised of one or more Microprocessors (uPs) 104, such as Intel Pentium™ or P6 microprocessors, and one or more Memories (MEMs) 106 for storing operating system and applications programs for controlling operations of the PM 102. Assuming, for purposes of illustration, a single UP 104 and MEM 106, each UP 104 and MEM 106 may be connected directly to an internal system bus, such as an ISA Bus 108, or to a high speed, high capacity Local Bus 110 which in turn is connected to ISA Bus 108 through a Local Bus Interface (LBI) 112. In the latter implementation, certain devices which exchange large volumes of data with UP 104 or MEM 106, such as a Hard Disk Controller (HDC) 114 or a Video Display Controller (VDC) 116, are connected from Local Bus 110 to exchange data directly with UP 104 and MEM 106, the higher data transfer rates available through Local Bus 110 thereby significantly enhancing the speed of operation of the system. In other implementations, such devices as HDC 114 and VDC 116 may be connected from ISA Bus 108, as may such devices as a Keyboard/Mouse Controller (K/MC) 1118. In still other implementations, these and other devices may be connected from yet other system buses or in other ways, as will be described below.

ISA Bus 108 is often interconnected with further system buses, each of which is optimized for certain types of operations. For example, ISA Bus 108 may be connected to a Extended ISA (EISA) Bus 120, and to an X Bus 122, through a bridge circuit generally referred to as an EISA System Component (ESC) 124. EISA Bus 120, in turn, may connect to such devices as HDCs 114, VDCs 116, and Input/Output Communications Ports (IOCP) 126 while X Bus 122 connects to such devices as a BIOS Memory (BIOS) 128 for storing the system's Basic Input/Output System programs, generally referred to as the system BIOS.

As is well known in the relevant arts, MEM 106 stores user programs and operating system programs containing program instructions for directing the operations of UP 104 and other components of PM 102. BIOS 128, in turn, stores microprograms corresponding to instructions and commands that may appear in the user and operating system programs wherein the instructions of the microprograms are hardware level microinstructions for controlling the detailed operations of the PM 102 hardware components, including uP 104 and MEM 106. The instructions and commands appearing in the user and operating system programs are provided as addresses to BIOS 128, which responds by reading out a corresponding microprogram that directs the operations of the PM 102 hardware components in performing the operations corresponding to the instructions or commands of the user and operating system programs.

Referring again to EISA Bus 120, as shown in FIG. 1, EISA Bus 120, in turn, may be connected through a Personal Computer Extended Bus interface (PCEB) 130 to a Personal Computer Interconnect (PCI) Bus 132 which in turn may connect to such devices as a Floppy Disk Controller (FDC) 134, a Hard Disk Array Controller (HDAC) 136 or a Network Communication Controller (NetC) 138. PCI Bus 132 may further be connected through a Local Area Network Controller (LANC) 140 to a Local Area Network Bus (LAN) 142 to other PMs 102 of System 100, and one or more System 100s may be further interconnected through LAN 140. Finally, PCI Bus 132 may be connected through a PCI Bridge (PCIB) 144 to still further buses, such as a SCSI Bus 146 connecting to such devices as further disk controllers, printers and so on.

In summary, therefore, as illustrated above and as well understood in the relevant arts, microprocessor based systems are generally implemented using effectively standardized components interconnected through standardized buses. For example, most microprocessor based systems use microprocessors and memory components selected from a relatively limited and commonly available and widely used family of such components, such as Intel 86xxx and Pentium™ families of microprocessors or the Motorola 68xxx family of microprocessors. Other system components, such as displays, disk drives, communications controllers, keyboards and mouse devices and their associated standardized controllers, drivers and interface units are similarly selected from relatively limited, commonly available and widely used families of such components, most of which are designed to widely accepted standards. In addition, and as briefly illustrated above, the buses through which the components are interconnected, and thus the signals and protocols executed on the buses, are similarly standardized, examples of such being the ISA, EISA, X, and PCI buses discussed above, all of which are accepted as industry standard buses and which conform to accepted industry standards.

It is also apparent, however, as is also well understood in the relevant arts, that the ways in which these standardized components may be interconnected may vary widely from system to system. For example, it has been illustrated above that in a given system the video display controller may be connected to either ISA Bus 108 or a Local Bus 110.

Referring now to PM 102's BIOS 128 for storing the system's Basic Input/Output System (BIOS) programs, while it is possible to connect BIOS 128 from any of the common buses of a PM 102, it is usual and typical that BIOS 128 will be connected from X-Bus 122. The following discussion of the present invention will therefore assume that BIOS 128 is connected from X-Bus 122 and is addressed by addresses provided through EISA Bus 120 to provide instructions to other components of PM 102 as necessary for the operation being performed. Any modifications to the described invention to adapt the present invention to different system configurations, such as connecting BIOS 128 from a different system bus, will, moreover, be readily apparent to those of ordinary skill in the relevant arts.

2. BIOS Memory Address Decoder (FIG. 2)

Figure 2:
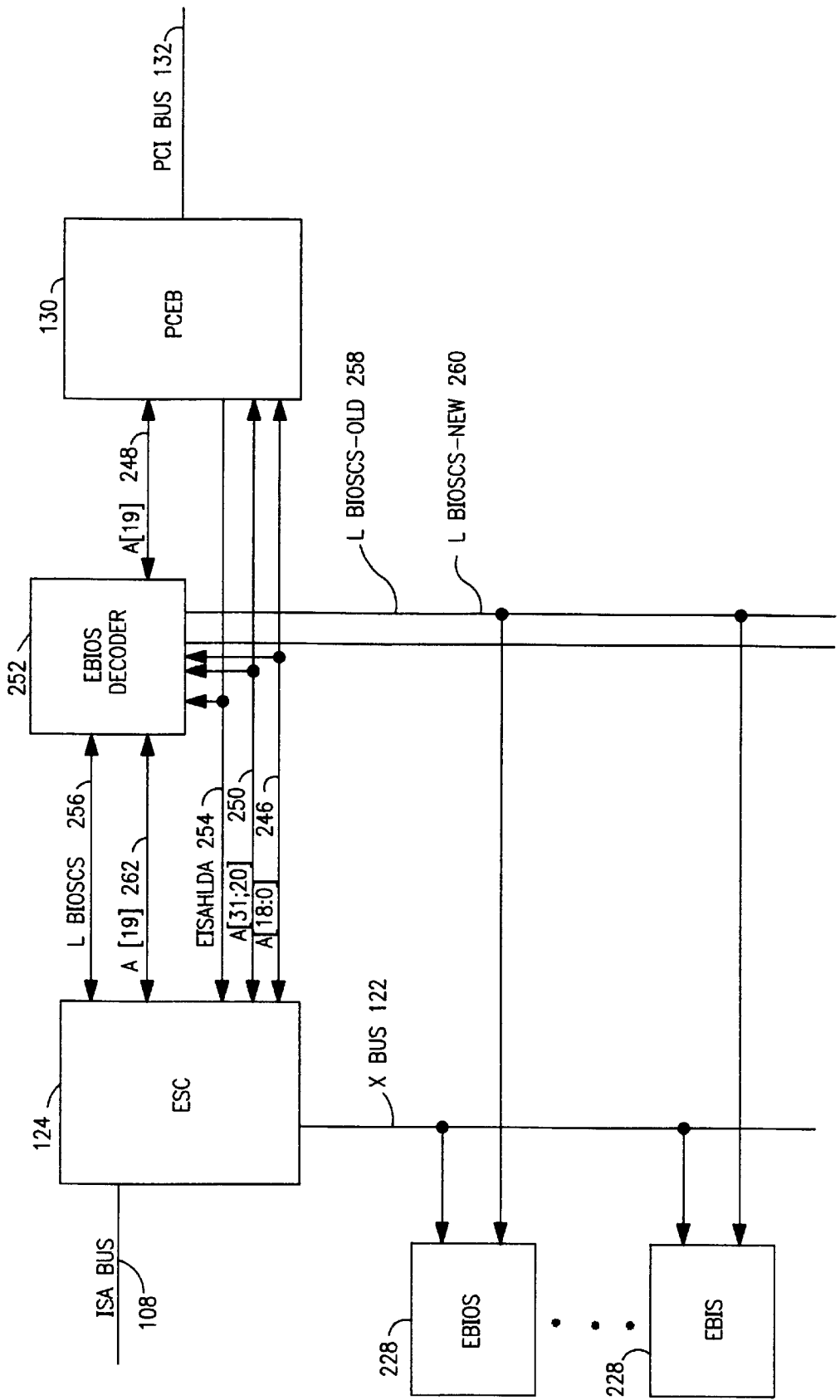
FIG. 2 is a diagrammatic representation of an extended BIOS memory address decoder of the present invention; and, FIG. 3 is a diagrammatic representation of the memory space of a system incorporation the present invention.

Referring now to FIG. 2, therein is illustrated the present invention for expanding or extending the system address space usable for system BIOS memory and programs under the above exemplary assumptions. As represented therein, and as described above, BIOS 128 is typically connected from X-Bus 122 and addresses into the BIOS memory space are generally provided to X-Bus 122 through EISA Bus 120 wherein EISA Bus 120 is typically interfaced with X-Bus 122 through a ESC 124.

Referring to FIG. 3, in a typical implementation of a PM 102, ESC 124 will be, for example, an Intel 82374EB EISA System Component or equivalent circuit, designed to receive addresses appearing on EISA Bus 120, to decode BIOS addresses in three 512 kilobyte ranges occurring, respectively, below the system address space boundaries occurring at 1 megabyte, 16 megabytes and 4 gigabytes, and to provide the BIOS addresses to BIOS 128 on X-Bus 122 to read BIOS programs therefrom. FIG. 3 illustrates the three ranges occupied by BIOS addresses, with the column headed "Address<1 MB" illustrating the BIOS addresses normally residing just below the 1 MB system address space boundary, the column headed "Address<16 MB" illustrating the BIOS addresses normally residing just below the 16 MB system address space boundary, and the column headed "Address<4 GB" illustrating the BIOS addresses normally residing just below the 4 GB system address space boundary. As illustrated in FIG. 3, the 512 kilobyte BIOS address space in each range is structured as four 16 kilobytes Low BIOS sections, identified as Low BIOS 1 300A, Low BIOS 2 300B, Low BIOS 3 300C and Low BIOS 4 300D, a 64 kilobyte High BIOS 302 section, and a 384 kilobyte Enlarged BIOS 304 section. It will be noted that the address ranges for the Enlarged BIOS 304 sections are not given in the columns headed "Address<1 MB" and "Address<16 MB", but are marked only as "n/a", and that only the upper address of FFF80000–FFFDFFFF of the Enlarged BIOS 304 section is given in the column headed "Address<4 GB" because it is well understood by those of skill in the art that the Enlarge BIOS 304 section in each instance extends downwards by 384K from the lower edges, respectively, of the corresponding Low BIOS 300A section, so that the BIOS address space normally occupies a total address space of 512K. An examination of FIG. 3 will thereby show that there is a address gap, that is, a range of unused addresses, of 512 kilobyte in the address range of 4 gigabytes to 1 megabyte and another in the address range of 1 megabyte to 512 kilobytes. There is therefore one address gap just below the normal BIOS address space that occupies the address space extending downwards from the 4 GB system address space boundary and a second address gap just below the normal BIOS address space that occupies the address space extending downwards from the 16 MB system address space boundary. The address gap extending downwards from the lower range of the normal BIOS address space that extends downwards from the 16 MB system address space boundary, for example, therefore lies directly between the two normal BIOS address spaces, that is, in the area below the normal BIOS address space below the 4 GB boundary and above the upper range of the normal BIOS address space that extends downwards from the 16 MB boundary. According to the present invention, this unused address space has been selected to be used as an additional expanded or extended BIOS memory address space.

Referring again to FIG. 2, and according to the present invention, an additional expanded or extended BIOS memory, identified as Extended BIOS Memory (EBIOS) 228, having a capacity of 512 kilobytes is connected from X-Bus 122 in the same manner as the original BIOS 128, thereby effectively doubling the memory available for storing BIOS programs.

It will be further noted that EISA Bus 120, which is the source of addresses to BIOS 128 and the new Extended BIOS Memory (EBIOS) 228 on X-Bus 122, includes 32 bit addresses carried on a corresponding 32 address lines designated as A[18:0] 246, A[19] 248 and A[3 1:20] 250. It will also be noted, with reference to FIG. 3, that the only difference between addresses to the previously existing BIOS memory address space of BIOS 128 and the new BIOS memory address space of EBIOS 228 is in address bit 19 appearing on A[19] 248.

It will be noted, however, that presently existing ESC 124s are not presently designed to accommodate or distinguish between two BIOS memories connected from X-Bus 122, but are designed under the assumption that there will be only one BIOS 128 occupying the customary, original range of addresses on X-Bus 122. According to the present invention, therefore, the new address space of EBIOS 228 is effectively mapped onto the previous address space of the original BIOS 128 as regards the BIOS addresses appearing on EISA Bus 120 and X-Bus 122 and corresponding address locations in BIOS 128 and EBIOS 228 are distinguished by enable signals, described below. As such, two addresses appearing on EISA Bus 120 and differing only in bit 19, that is, with one directed to a location in BIOS 128 and the other directed to the corresponding location in EBIOS 228, will result in the same address appearing on X-Bus 122. Which of BIOS 128 or EBIOS 228 responds and provides a BIOS program output is then determined by the enable signals to BIOS 128 and EBIOS 228, which are, in turn, determined from bit 19 of the address on EISA Bus 120.

According to the present invention, therefore, a Extended BIOS (EBIOS) Decoder 252 is connected from EISA Bus 120 address lines A[18:0] 246, A[ 19] 248 and A[31:20] 250, from EISA Bus 120's EISA Hold A control line (EISAHLDA) 254, and from a Low BIOS Control Signal (LBIOSCS) 256 from ESC 124. EBIOS Decoder 252, in turn, generates two enable signals to enable inputs of BIOS 128 and EBIOS 228, Low BIOS Control Signal-Old (LBIOSCS_OLD) 258 and Low BIOS Control Signal-New (LBIOSCS_NEW) 260, which respectively are the enable signals for BIOS 128 and EBIOS 228, and a bit 19 address output (A[19]) 262 to the A[ 19] input of ESC 124.

When an address appears on EISA Bus 120, EBIOS Decoder 252 determines the state of EISAHLDA 254 to determine whether the address is to ESC 124, and thus potentially to BIOS 128 or EBIOS 228, rather than being generated by ESC 124, and whether the address is within the range of BIOS 128 and EBIOS 228, that is, is in the ranges (in hexadecimal) FFF00000–FFF7FFFF and FFF80000–FFFFFFFF.

If the address is to ESC 124 and is in the range of BIOS 128 and EBIOS 228, then EBIOS Decoder 252 drives A[19] 262 to ESC 124 low, thereby allowing ESC 124 to assert LBIOSCS 256 wherein LBIOSCS is a BIOS memory enable signal originally generated by ESC 124 to indicate that a valid BIOS address has been received. ESC 124 will, at this time, pass the address received from EISA Bus 120 to X-Bus 122 to address both BIOS 128 and EBIOS 228, but with the A[19] address bit on X-Bus 122 forced low, as received by ESC 124 from EBIOS Decoder 252 as A[19] 262.

At the same time, EBIOS Decoder 252 will respond to LBIOSCS 256 received from ESC 124 to assert one of LBIOSCS_OLD 258 or LBIOSCS_NEW 260, depending upon the value of A[19] 248 as received by EBIOS Decoder 252 from EISA Bus 120. If A[ 19] 248 is low, indicating an address in the original BIOS address space, then EBIOS Decoder 252 will assert LBIOSCS_OLD 258 to enable BIOS 128 so that the addressed information is read from the original BIOS address space of BIOS 128. If A[19] 248 is high, indicating an address in the new, extended BIOS address space, then EBIOS Decoder 252 will assert LBIOSCS_NEW 260 so that the addressed information is read from the new, extended BIOS address space of EBIOS 228.

It will be apparent from the above that EBIOS Decoder 252 may be implemented in a system not originally having a EBIOS 228 and that a EBIOS 228 may be subsequently added to the system, thereby implementing the functionality provided therein, with no further modification to the system. It will also be apparent that the A[ 19] address input to EBIOS Decoder 252 may be jumpered low in systems not having a EBIOS 228, and until such is installed, to force all BIOS memory decodings into the original range.

It will be still further apparent that the decoder and methods described above may be extended to more than one additional EBIOS 228. For example, by examining and controlling both bits A[19] and A[20] from EISA Bus 120 to ESC 124 and EBIOS Decoder 252, rather than only bit A[19], the BIOS memory space decoding of ESC 124 may be extended up to the full 2 megabyte range of ESC 124.

Finally, it will be noted that in a present implementation, EBIOS Decoder 252 is preferably constructed using a programmable logic array to implement the logic and steps described above, but that other implementations are possible, including modifications to future generations of ESC 124 to incorporate the functionality described herein above.

While the invention has been particularly shown and described with reference to preferred embodiments of the apparatus and methods thereof, it will be also understood by those of ordinary skill in the art that various changes, variations and modifications in form, details and implementation may be made therein without departing from the spirit and scope of the invention as defined by the appended claims. Therefore, it is the object of the appended claims to cover all such variation and modifications of the invention as come within the true spirit and scope of the invention.

What is claimed is:

1. In a computer system including a processor for performing operations on data, a memory for storing programs including sequences of program instructions for controlling the operations of the processor, a bus interconnecting the processor and memory for the transfer of program instructions, data and addresses therebetween, a BIOS memory for storing BIOS microprograms for controlling operations of the processor wherein the BIOS microprograms correspond to program instructions and include sequences of microinstructions for directing corresponding operations of the processor, and a system component connected from the bus for receiving program instructions as bus addresses in a first instruction address range and providing corresponding BIOS memory addresses in a corresponding first BIOS address range normally reserved for BIOS microprograms to the BIOS memory for reading corresponding BIOS microprograms from the BIOS memory to control the operations of the microprocessor, a BIOS address decoder for addressing an extended BIOS memory for storing additional microprograms, comprising:

the system component connected from the bus to receive a first subset of bus address bits representing bus addresses in the first BIOS instruction address range normally reserved for BIOS microprograms and responsive to the first subset of bus address bits to generate corresponding BIOS addresses in the first BIOS address range normally reserved for BIOS microprograms and a BIOS address indication indicating that the first subset of bus address bits indicates a bus address in the first instruction address range normally reserved for BIOS microprograms, and an extended BIOS decoder connected from the bus to receive a second subset of bus address bits representing bus addresses including an extended BIOS instruction address range outside of the first instruction address range normally reserved for BIOS microprograms and from the system component to receive the BIOS address indication output and responsive to the second subset of bus address bits and the BIOS address indication for generating an extended BIOS memory enable output having a first state when the second subset of bus address bits does not represent a bus address including the extended BIOS instruction address range outside of the first instruction address range normally reserved for BIOS microprograms and a second state when the second subset of bus address bits represent a bus address including the extended BIOS instruction address range outside of the first instruction address range normally reserved for BIOS microprograms, wherein the BIOS addresses generated by the system component and the extended BIOS memory enable output generated by the extended BIOS decoder represent BIOS addresses in an extended BIOS address range that concurrently includes both the first BIOS address range residing in the BIOS memory and normally reserved for BIOS microprograms and the extended BIOS instruction address range residing in the extended BIOS memory outside of the first instruction address range normally reserved for BIOS microprograms.

2. The extended BIOS address decoder of claim 1, further comprising:

a BIOS memory connected from the system component to receive the BIOS addresses in the first BIOS address range and from the extended BIOS decoder to receive the extended BIOS memory enable output and responsive to the BIOS addresses and to the extended BIOS memory enable output in the first state to provide microprograms from a first set of microprograms, and an extended BIOS memory connected from the system component to receive the BIOS addresses in the first BIOS address range and from the extended BIOS decoder to receive the extended BIOS memory enable output and responsive to the BIOS addresses and to the extended BIOS memory enable output in the second state to provide microprograms from an extended set of microprograms.

* * * * *